United States Patent
Sharpe et al.

[15] 3,652,340
[45] Mar. 28, 1972

[54] APPARATUS FOR AND METHOD OF FORMING POST SEAL FOR LEAD-ACID CELL

[72] Inventors: Louis H. Sharpe, Morris Township; Jayant R. Shroff, Morristown; Frank J. Vaccaro, Parsippany, all of N.J.

[73] Assignee: Bell Telephone Laboratories, Incorporated, Murray Hill, N.J.

[22] Filed: Dec. 29, 1969

[21] Appl. No.: 888,388

Related U.S. Application Data

[63] Continuation-in-part of Ser. No. 831,611, June 9, 1969, abandoned.

[52] U.S. Cl. ............................................136/168, 136/176
[51] Int. Cl. ...........................................................H01m 1/02
[58] Field of Search ..........................................136/168, 176

[56] References Cited

UNITED STATES PATENTS

| | | | |
|---|---|---|---|
| 2,892,006 | 6/1959 | Belove | 136/168 |
| 3,434,883 | 3/1969 | Babusci et al | 136/168 |

*Primary Examiner*—Donald L. Walton
*Attorney*—R. J. Guenther and Edwin B. Cave

[57] ABSTRACT

A post seal design for a lead-acid cell utilizes the combination of a one-piece flexible seal and a post coated with a relatively rigid adhesive coating to inhibit acid leakage. Additionally, the post may contain a number of grooves in its periphery to further inhibit leakage resulting from corrosion of the post. The coating may be applied to the post prior to the installation of the flexible seal thereon, or alternatively, the flexible seal may be used as a mold to cast the coating in place on the post after the installation of the flexible seal.

6 Claims, 3 Drawing Figures

PATENTED MAR 28 1972 3,652,340

INVENTORS L. H. SHARPE
J. R. SHROFF
F. J. VACCARO

BY

ATTORNEY

APPARATUS FOR AND METHOD OF FORMING POST SEAL FOR LEAD-ACID CELL

This application is a continuation-in-part of copending application, Ser. No. 831,611, filed June 9, 1969, now abandoned.

BACKGROUND OF THE INVENTION

1. Field of the Invention

This invention relates to lead-acid storage batteries and more particularly to a new post seal design for such batteries.

2. Description of the Prior Art

Significant numbers of lead-acid batteries, representing an investment of millions of dollars, are used for standby power in the telephone plant. Because of the large investment and very limited use, such batteries should have a useful life of several years.

A major problem area of lead-acid batteries with extended lives is acid leakage around the battery posts. The leakage may result from electrolyte being splashed or thrown during handling of the battery, from gassing during overcharge of the battery, from capillary rise of the electrolyte or from the growth of corrosion products along the battery posts. The leakage from the growth of corrosion products along the post is especially prevalent on the positive post where lead oxide products form or grow as the cell ages.

None of the presently used post seals are completely satisfactory. Most of these seals are rigid type seals which allow no movement between the post and the cover. Thus, the seal may be easily broken due to stresses and movements caused by handling of the battery. Likewise the growth of the positive plates and positive post upon aging causes relative motion between these parts and the cell cover which tends to break a rigid seal.

Another disadvantage of most presently used seals is the short seal lengths—usually less than one-half inch. This short seal length can more readily be breached by the acid than could a longer seal length.

Presently used seals do not provide an effective means of inhibiting the growth of corrosion along the battery posts.

Still another disadvantage of most presently used seals is that few of these seals provide a redundant sealing system. A failure of the primary seal results in extensive leakage problems very quickly.

A significant improvement in the design of post seals for lead-acid batteries was disclosed in U.S. Pat. No. 3,434,883, issued Mar. 25, 1969, to L. D. Babusci, B. A. Cretella, D. O. Feder, and D. E. Koontz, and in divisional application thereof, Ser. No. 778,900, filed Oct. 3, 1968, and issued Jan. 20, 1970 as Pat. No. 3,490,954. This patent disclosed a three-piece, flexible seal which provided an increased seal length, flexibility to accommodate motion and growth of the plates and post relative to the cover, and a redundant sealing system. A major disadvantage of this seal, however, is the difficulty of assembly because of the three-piece design. Further, this post seal design provided no adequate sealing means between the post and its surrounding shrink tube to control the growth of corrosion products along the post.

Accordingly, it is an object of this invention to improve the post seal of lead-acid cells to eliminate leakage of acid around the posts.

Another object is to simplify the design of the post seal of lead-acid cells to facilitate the assembly of such seals.

SUMMARY OF THE INVENTION

The foregoing objects and others are achieved in accordance with the principles of the invention by the use of an electrode post which is coated with corrosion-inhibiting material and a one-piece flexible tube or seal surrounding the post and also connected to the cell cover. The post is coated with an appropriate material such as a relatively rigid epoxy resin. The fully extended one-piece flexible tube is then slightly inflated by a pneumatic tool and is then slipped onto the coated post. When the air pressure is removed, a portion of the tube then grips the post with a shrink fit, thereby forming a gastight seal with the coated post to prevent acid leakage from splashing, gassing or capillary action. The coat of material on the post prevents leakage from the growth of corrosion. The remaining portion of the flexible tube is turned inside out and fastened over the exterior surface of a cylindrical flange which protrudes from the cover and surrounds the post, thereby forming a gastight seal with the cell cover. In essence, the flexible tube provides the liquid electrolyte and gas seal while the coat of material on the post provides the post corrosion seal. A corrugated rubber gasket formed as an integral part of the tube on its exterior surface forms a close fit with the interior of the protruding cover flange to act as a secondary liquid electrolyte and gas or vapor seal. The portion of the tube which is turned inside out has sufficient flexibility to accommodate any motion between the plates, post, and cover. Additionally, the one-piece flexible tube or seal eliminates the necessity for joints which are required by seals with multiple parts.

As an alternative to coating the post with the epoxy resin prior to the installation of the flexible tube, the tube may be installed on the post and used as the mold for casting the resin about the post. This method insures the integrity of the joint between the flexible tube and the post coating as well as the integrity of the joint between the post coating and the post itself.

BRIEF DESCRIPTION OF THE DRAWINGS

A more complete understanding of the present invention and the objects and features thereof may be gained from the following detailed description and accompanying drawings, in which.

DETAILED DESCRIPTION

Figure 1:
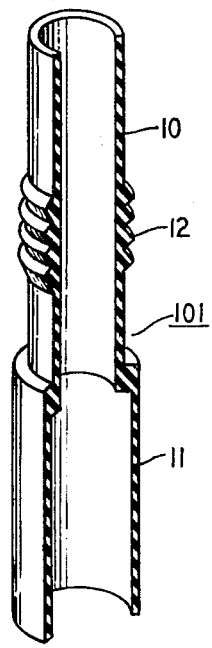
FIG. 1 is a sectional view of the fully extended one-piece flexible tube.

FIG. 1 shows a sectional view of a one-piece post flexible tube or seal 101 comprising a sleeve portion 10, a flexible bag portion 11 and a corrugated gasket 12 formed on the exterior surface of the sleeve 10. The seal 101 may be made from any appropriate acid-resistant material such as butyl rubber, silicone rubber, or polyethylene. The interior diameter of the sleeve portion 10 of the tube 101 is made slightly smaller than the diameter of the coated battery post to insure a shrink fit upon installation.

The flexible seal 101 may advantageously be used with a battery post which has received an appropriate coating of acid-resistant, corrosion-inhibiting material in some operation prior to the installation of the seal 101 over the post as is explained in the following sections.

Figure 2:
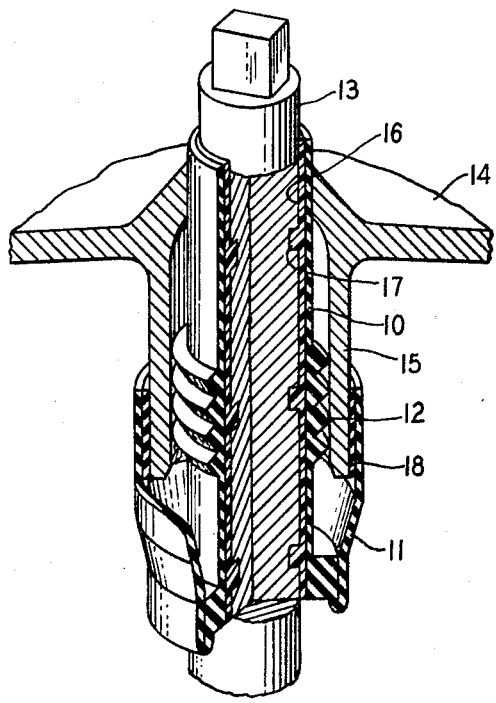
FIG. 2 is a sectional view showing the tube assembled on the coated post in the lead-acid battery; and, FIG. 3 is a sectional view of a fully extended one-piece flexible tube which could advantageously be used as a mold for casting the post coating after the tube is installed on the post.

FIG. 2 shows a sectional view of the one-piece flexible tube 101 assembled on a coated post in the lead-acid battery. The battery post 13 exits the cell through an opening in the battery cover 14. The opening is surrounded by a substantially cylindrical flange 15 which protrudes downward into the cell. The post 13 is coated with an acid-resistant, relatively rigid adhesive material to form a coating 16. One appropriate material is a rigid epoxy resin coating 16 which controls the growth of corrosion products on the post 13 and thus inhibits acid leakage due to corrosion along the post. The coating 16 also forms a good surface with which the sleeve 10 of the flexible seal can form a gastight seal to prevent leakage of liquid electrolyte and gases from splashing, gassing, or capillary action. Depending in part upon the design life of the cell, a suitable oxidation-resistant grease may be used for coating 16 instead of the epoxy resin. Although corrosion is primarily present on the positive post, the coating 16 may advantageously be used on both the positive and negative battery posts. The coating 16 may be applied in some operation prior to insertion of the post 13 in the cover 14, and prior to the installation of seal 101 on the post.

A number of grooves 17 may be formed around the periphery of the post 13 and filled with the coating 16 to further inhibit the growth of corrosion on the post 13. The grooves 17 inhibit the growth of corrosion products by increasing the effective path length that the corrosion must travel and by developing compressive restraints on the corrosion products which are less dense than the metal being corroded. The grooves may have various configurations. However, configurations having sharp corners or angles appear to be most effective.

The fully extended tube 101 is inserted, flexible bag portion 11 first, over the coated battery post 13. Because the coated battery post 13 is slightly larger than the inside diameter of the sleeve portion 10 of the seal 101, the post 13 acts as a stopper on one end of the sleeve 10. The sleeve 10 may be slightly inflated and easily slipped into position on the coated post 13. When the air pressure is released, the sleeve 10 forms a shrink fit with the coated post 13, thereby creating a gastight seal which prevents acid from leaking between the sleeve 10 and the post 13 because of splashing, gassing or capillary action. Although it is not required under normal conditions, an appropriate adhesive, such as butyl adhesive, may be applied to the inner surface of the sleeve 10 and the coated post 13 to further insure a gastight seal and to further stabilize the position of the sleeve 10 on the coated post 13. Alternately, ribs could be provided on the post 13 to fix the sleeve 10 in position and prevent any slippage.

After the sleeve portion 10 of the seal 101 is positioned on the post 13, the flexible bag portion 11 is reversed or turned inside out and slipped over the exterior surface of the protruding cover flange 15 which surrounds the post 13. The bag 11 is fastened to the flange 15 by a suitable adhesive 18 such as butyl adhesive to form a gastight acid-resistant seal which prevents acid from leaking between the sleeve 10 and the cover 14. The bag 11 has sufficient flexibility to accommodate any relative motion between the post 13 and the cover 14 caused by handling or by growth of the battery grid plates or electrode post upon aging.

The corrugated gasket 12, formed as an integral part of the exterior surface of sleeve 10, forms a seal with the interior surface of the flange 15. Thereby a secondary seal is formed to further guard against acid leakage between the sleeve 10 and cover 14.

Figure 3:
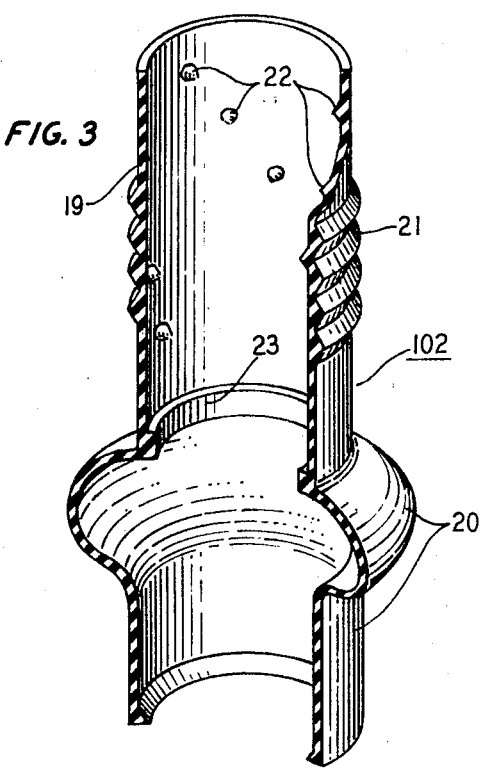

As previously mentioned, an alternative to casting the epoxy resin coating 16 about the post 13 prior to installation of the flexible tube is to use the flexible seal itself as a mold for casting the resin coating. FIG. 3 shows a flexible tube or seal 102 which might advantageously be used for such an application.

Tube 102 comprises a sleeve 19, a flexible bag section 20, and a corrugated gasket 21 formed on the exterior surface of sleeve 19 which are somewhat similar to analogous parts of tube 101.

Tube 102 also has a number of spaced projections 22 on its interior surface which space the tube 102 from the post 13 upon installation thereon. At the bottom end of the sleeve 19 is a circumferential rib 23 around the periphery of the interior surface of the sleeve 19. The rib 23 forms a seal around the post 13 when the tube 102 is installed thereon for purposes to be described later.

Prior to installation on post 13, the interior surface of tube 102 is thoroughly cleaned with a suitable cleaner to insure a good bonding surface. A commercially available alkaline laboratory cleaner, such as that available under the trademark of ALCONOX from Alconox, Inc., may advantageously be used for such cleaning. After being cleaned, the inside surface of tube 102 may advantageously be coated with a butyl adhesive to insure a better seal from the operations which subsequently follow. Tube 102 is then installed over post 13. A suitable resin, such as an epoxy resin, to form coating 16 is then forced into the voids between the tube 102 and post 13, i.e., into the interstices between projections 22. Rib 23 dams this resin and keeps it from leaking out prior to setting. The resin might advantageously be forced into the voids between tube 102 and post 13, through a hypodermic-type injector which is inserted through sleeve 19 just above rib 23. This method of injecting the resin insures that all of the air is swept out of the voids and replaced by resin to insure an integral joint. After the voids have been completely filled with resin the apparatus is heated to the proper temperature for setting the resin to form coating 16. The resulting coating 16 has very strong adhesive joints with both the post 13 and tube 102 to insure no acid leakage either from the growth of corrosion along the post 13 or from the escape of liquid or gas from the cell.

After the coating 16 has been properly cured, the apparatus is inserted into the cover 14 of the battery. The flexible bag portion 20 of tube 102 is then turned inside out and fastened over the exterior surface of flange 15 in the same manner as the bag portion 11 of tube 101 shown in FIG. 2. Also, gasket 21 forms a secondary seal with the interior surface of flange 15 in the same manner as the gasket 12 of tube 101.

It is to be understood that the embodiment of the post seal shown herein is merely illustrative of the principles of the invention. Various modifications thereto may be made by those skilled in the art without departing from the spirit and scope of the invention.

What is claimed is:

1. A lead-acid battery comprising, in combination:
   a battery receptacle;
   a cover for said receptacle having at least one opening therein, said cover having a flange depending therefrom into said receptacle and surrounding said opening;
   an electrode post mounted within said receptacle and extending through said opening; and
   sealing means for preventing leakage of electrolyte around said post, said sealing means including:
   a first seal for preventing said leakage from growth of corrosion along said post comprising a tightly adhering coating of acid-resistant material covering said post, said coating being located adjacent said opening and extending along a substantial length of said post within said receptacle; and
   a second seal for preventing said leakage of said electrolyte in liquid and gaseous form comprising a tubular structure of acid-resistant, resilient material having first and second sections, said first section surrounding said post and forming a shrink fit, vapor-tight joint with said coating along substantially the entire length thereof, said second section surrounding said flange and forming a vapor-tight joint around the entire periphery thereof.

2. Apparatus in accordance with claim 1 wherein said first section of said structure includes:
   a plurality of projecting members on the interior surface thereof for spacing said first section from said post so that a resin of acid-resistant material can be injected therebetween; and
   a circumferential rib around the periphery of the inner surface on one end thereof, said rib forming a liquid-proof seal with said post around the entire periphery of said post to prevent leakage of said resin, so that said second seal can be used as a mold for forming said coating about said post.

3. Apparatus in accordance with claim 1 wherein said post includes at least one groove around the periphery thereof, said coating filling said groove so as to increase the effective path length presented by said coating to said growth of corrosion thereby to further reduce leakage of electrolyte.

4. Apparatus in accordance with claim 1 wherein said first section of said structure includes a circumferential gasket formed about the exterior surface thereof, said gasket contacting the interior surface of said depending flange around the entire periphery so as to form a secondary seal for preventing leakage of liquid and gaseous electrolyte.

5. The method of making a lead-acid battery including a receptacle, a cover for said receptacle having at least one opening therein surrounded by a flange depending from said cover, and an electrode post mounted within said receptacle and extending through said opening, comprising the steps of:
   surrounding a substantial length of said post by a first portion of a tubular structure of resilient, acid-resistant material so that said first portion is spaced from said post by protruding members on the inner surface of said first portion;
   filling the space between said post and said first portion with the resin of an acid-resistant material;
   curing said resin to form a tightly adhering coating about said post which substantially reduces the growth of corrosion along said post, said coating adhering to said first portion and forming a vapor-tight joint therewith so as to create a sealed post assembly;
   inserting said sealed post assembly into said receptacle and positioning said first portion adjacent said opening so that said first portion extends a substantial distance within said receptacle; and
   attaching a second portion of said tubular structure around the entire periphery of said flange to form a vapor-tight joint therewith so that leakage of electrolyte from said battery is eliminated.

6. The method of forming a post seal for a lead-acid cell including an electrode post and cover, comprising the steps of:
   surrounding said post with a substantially tubular structure of acid-resistant, resilient material, said structure having said first and second sections;
   filling the space between said first section and said post with the resin of an acid-resistant, adhesive material, said filling step including inserting a hypodermic-type injector through said first section and injecting said resin into said space through said injector thereby to ensure that said space is completely filled with said resin;
   curing said resin to form a coating of said acid-resistant adhesive material on said post, said coating forming substantially continuous vapor-tight joints with said post and said first section;
   inserting said coated post into said cover; and
   attaching said second section to said cover to form a vapor-tight joint therewith, whereby acid leakage around said post is substantially eliminated.

* * * * *